US009399421B2

(12) United States Patent
Lu

(10) Patent No.: US 9,399,421 B2
(45) Date of Patent: Jul. 26, 2016

(54) HINGE
(71) Applicant: Dongguan Weihong Hardware and Plastic Products Co., Ltd., Dongguan (CN)
(72) Inventor: Wei Lu, Dongguan (CN)
(73) Assignee: DONGGUAN WEIHONG HARDWARE AND PLASTIC PRODUCTS CO., LTD., Dongguan (CN)
(*) Notice: Subject to any disclaimer, the term of this patent is extended or adjusted under 35 U.S.C. 154(b) by 0 days.
(21) Appl. No.: 14/886,512
(22) Filed: Oct. 19, 2015
(65) Prior Publication Data
US 2016/0040464 A1 Feb. 11, 2016
(51) Int. Cl.
*E05D 7/00* (2006.01)
*E05D 11/10* (2006.01)
*B60N 2/48* (2006.01)
(52) U.S. Cl.
CPC ............ *B60N 2/4852* (2013.01); *B60N 2/4847* (2013.01)
(58) Field of Classification Search
CPC ............. Y10T 16/541; Y10T 16/5402; Y10T 16/54026; Y10T 16/54028; Y10T 16/5409; Y10T 16/54035; Y10T 16/540345; Y10T 16/540247; Y10T 16/54025; Y10T 16/54024; B60N 2/20; B60N 2/22; B60N 2/235; B60N 2/2352; B60N 2/2213; B60N 2/224; B60N 2/433; B60N 2/4852; B60N 2/4847; E05D 11/10; E05D 11/1007; E05D 11/1028; E05D 11/084; E05D 3/122; E05D 2011/1092; A61F 5/0125; A61F 2005/0167; A61F 2005/0158; A47C 1/026; A47C 7/38; A47C 7/40
See application file for complete search history.

(56) References Cited

U.S. PATENT DOCUMENTS

| | | | | | |
|---|---|---|---|---|---|
| 3,232,136 A | * | 2/1966 | Bahmuller | ............ | A47C 1/026 297/366 |
| 3,902,757 A | * | 9/1975 | Yoshimura | ........... | B60N 2/2352 16/324 |
| 4,502,472 A | * | 3/1985 | Pansiera | ................ | A61F 5/0125 602/16 |
| 5,938,629 A | * | 8/1999 | Bloedau | ................ | A61F 5/0125 602/16 |
| 6,993,808 B1 | * | 2/2006 | Bennett | .................. | A61F 5/0125 16/321 |
| 2002/0057088 A1 | * | 5/2002 | Carrozzi | .............. | A61B 5/0555 324/318 |
| 2005/0046260 A1 | * | 3/2005 | Yamashita | ............. | A47C 1/026 297/361.1 |
| 2009/0288270 A1 | * | 11/2009 | Yamashita | ............. | A47C 1/026 16/239 |
| 2010/0293748 A1 | * | 11/2010 | Yamashita | ............. | A47C 1/026 16/249 |
| 2013/0333161 A1 | * | 12/2013 | Lu | .......................... | A47C 17/86 16/332 |
| 2015/0176640 A1 | * | 6/2015 | Serocki | .................. | F16C 11/10 16/333 |

FOREIGN PATENT DOCUMENTS

| | | | | | |
|---|---|---|---|---|---|
| GB | 190805385 A | * | 0/1908 | | |
| GB | 976404 A | * | 11/1964 | ............. | A47C 1/026 |
| GB | EP 0832624 A2 | * | 4/1998 | ............ | A61F 5/0125 |
| JP | 10028624 A | * | 2/1998 | | |

* cited by examiner

*Primary Examiner* — Chuck Mah
(74) *Attorney, Agent, or Firm* — Shimokaji IP

(57) ABSTRACT

A hinge includes a first frame, a second frame, a bolt, a gear, an adjusting nut, a spring component, a shield, and an engaging component, the first frame has two first clamping portions for clamping the gear, the second frame has two second clamping portions for clamping the two first clamping portions, the adjusting nut is screwed on the bolt and provides clamping force, an accommodating cavity is opened in the second frame, the engaging component is configured therein and engages with the gear, the engaging component disengages from the gear when a first sidewall thereof presses against a sidewall of the accommodating cavity, the gear is prevented from rotating when a second sidewall of the engaging component presses against another sidewall of the accommodating cavity, the spring component is configured between the second frame and the engaging component, and the shield shields the gear.

10 Claims, 16 Drawing Sheets

HINGE

FIELD OF THE INVENTION

The present invention relates to a hinge, more particularly to a hinge whose reverse rotation operation is simple and convenient.

BACKGROUND OF THE INVENTION

Commonly, angles of a headrest of a car seat or a sofa can be adjusted to meet the requirement of the customers. One of the achievement manners is to set a hinge connected with the headrest in the car seat or sofa, and the headrest rotates with the hinge so as to change the angle between the headrest and the car seat or sofa. As such, the customer can adjust different tilting angles of the headrest according to his actual requirement to obtain a comfortable feeling.

In order to achieve the above functions, the structure of this hinge needs to meet two requirements: First, relative to the seat or the sofa, the hinge can drive the headrest to rotate to a satisfactory position in an angle range; secondly, when the headrest has been adjusted to the satisfactory position, and then the headrest can be fixed by the hinge to prevent from further rotating.

In the prior art, the hinge provided between the headrest and the seat or the sofa has engaging teeth and engaging positions therein, by which the headrest can rotate and be fixed, the engagement of the engaging teeth and the engaging positions limits the headrest to rotate only in one direction, that is, the headrest just can rotate forward relative to the seat or the sofa but is forbidden to rotate reversely so as to fix the headrest. If the headrest is wanted to be adjusted reversely, firstly the headrest rotates forward to the very end, thereby the engaging teeth disengage from the engaging positions, and then the headrest can be adjusted reversely.

It is thus clear that although this conventional hinge has angle adjustment function, but can not rotate reversely at any position when you want to adjust it back, the operation is complicated and time consuming.

Thus it's necessary to provide a hinge that can rotate reversely at any position, and the operation is simple and convenient.

SUMMARY OF THE INVENTION

One objective of the present invention is to provide a hinge, which can rotate reversely at any position, and the operation is simple and convenient.

To achieve the above objective, a hinge provided in the present invention includes a first frame, a second frame, a bolt, a gear, an adjusting nut, a spring component, a shield, and an engaging component having engaging teeth, the gear is rotatably set on the bolt, an end of the first frame has two opposite first clamping portions, the two first clamping portions are rotatably set on the bolt and clamp the gear, an end of the second frame has two opposite second clamping portions, the two second clamping portions are rotatably set on the bolt and clamp the two first clamping portions, the adjusting nut is screwed on the bolt and provides clamping force for the two first clamping portions and the two second clamping portions, an accommodating cavity is opened in the second frame, the engaging component is configured in the accommodating cavity and engages with the gear, the engaging component has a first sidewall, a second sidewall, and an end portion configured between the first sidewall and the second sidewall, the first sidewall and the second sidewall respectively are withstood with two sidewalls of the accommodating cavity in a separable manner, an unlocking space is defined between the end portion and a bottom wall of the accommodating cavity, when the first sidewall is withstood with the sidewall of the accommodating cavity, the engaging component moves downward to the unlocking space so as to disengage from the gear, when the second sidewall is withstood with the other sidewall of the accommodating cavity, the engaging component keeps engaging with the gear so as to prevent the gear from rotating, the spring component is configured between the second frame and the engaging component and provides elastic force for the engaging component to engage with the gear, and the shield is configured between the two first clamping portions and shields an outer edge of the gear.

Compared with the prior art, as the screw joint of the adjusting nut and the bolt can be used to provide clamping force for the two first clamping portions to clamp the gear, when pivoting the first frame forward, the gear can be urged to rotate synchronously with the first frame by the clamping force of the first clamping portions, as an unlocking space is defined between the end portion of the engaging component and bottom wall of the accommodating cavity, so when the gear rotates and urges the first sidewall of the engaging component to press against the sidewall of the accommodating cavity, the engaging component can overcome the elastic force of the spring component and move downward to the unlocking space, thereby disengaging from the gear, and the first frame and the gear can rotate further. When the gear turns to the next tooth, the spring component upwardly presses against the engaging component to engage with the gear, and the first sidewall is set apart from the sidewall of the accommodating cavity. When pivoting the first frame reversely by a roughly the same force as forward pivoting, the second sidewall of the engaging component is stopped by another sidewall of the accommodating cavity, and the engaging component can not move downwardly and keep engaging with the gear, thereby the first frame can not rotate by the force. While, when the force exerted on the first frame is increased enough to overcome the frictional force between the first clamping portions of the first frame and the second clamping portions and the gear, the first clamping portion can rotate relative to the second clamping portions and the gear, namely, the first frame starts to rotate reversely. The reverse rotation is started by the increased force applied on the first frame without rotating forward the first frame to the very end, and the operation is simple and time saving. In addition, the shield shields the exposed portion of the gear, not only protects the gear and the engaging component, but also enhance its appearance.

Preferably, a first washer is configured between the first clamping portion and the gear. The first washer acts as an elastic buffer between the first clamping portion and the gear and avoids rigid contact therebetween, thereby avoiding abrasion.

Preferably, a second washer is configured between the first clamping portion and the second clamping portion. The second washer acts as an elastic buffer between the first clamping portion and the second clamping portion and avoids rigid contact therebetween, thereby avoiding abrasion.

Preferably, the spring component is a spring leaf, both ends of which are positioned on the second frame, and a portion of the spring leaf is accommodated in the accommodating cavity and withstood with the end of the engaging component that is away form the gear. The spring leaf is used to provide elastic force for the engaging component to engage with the gear and then prevent the hinge from rotating. The portion of the spring leaf configured in the accommodating cavity can be pressed by the engaging component and make room for the engaging component to move downwardly when the gear is rotating.

Preferably, the first sidewall and the second sidewall are parallel to a central axis of the bolt.

Preferably, wherein the first frame includes two elongated plates fixedly connected with each other, and one end of the two elongated plates is bended to form the first clamping portions.

Preferably, the second frame includes a support rod and two holders, one end of the two holders is fixed to the support rod, the other end of the two holders is bended to form the two second clamping portions, and the accommodating cavity is opened in the two holders.

Specifically, each holder includes a clamping plate and a cover, two clamping plates are fixed to the support rod, the accommodating cavity is opened through the two clamping plates along a direction of the central axis of the bolt, and two covers are respectively fixed to the two clamping plates for covering the accommodating cavity and the engaging component. The cover shields the accommodating cavity and the engaging component so as to prevent dust and foreign substances from falling into the accommodating cavity to effect the engagement of the engaging component and the gear.

More specifically, the bolt has a bolt head, a third washer is configured between the cover and the bolt head, and another third washer is configured between the cover and the adjusting nut. The third washer acts as an elastic buffer between the cover and the bolt and the adjusting nut, and avoids rigid contact therebetween, thereby avoiding abrasion.

Preferably, two sides of each holder are respectively provided with a positioning portion extending toward the other holder, two positioning portions configured at the same side of the two holders are opposite, and two ends of the shield are respectively positioned between the two opposite positioning portions. As the end of the shield is positioned between the two opposite positioning portions, the shield could maintain its U shape well and get close to the gear.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
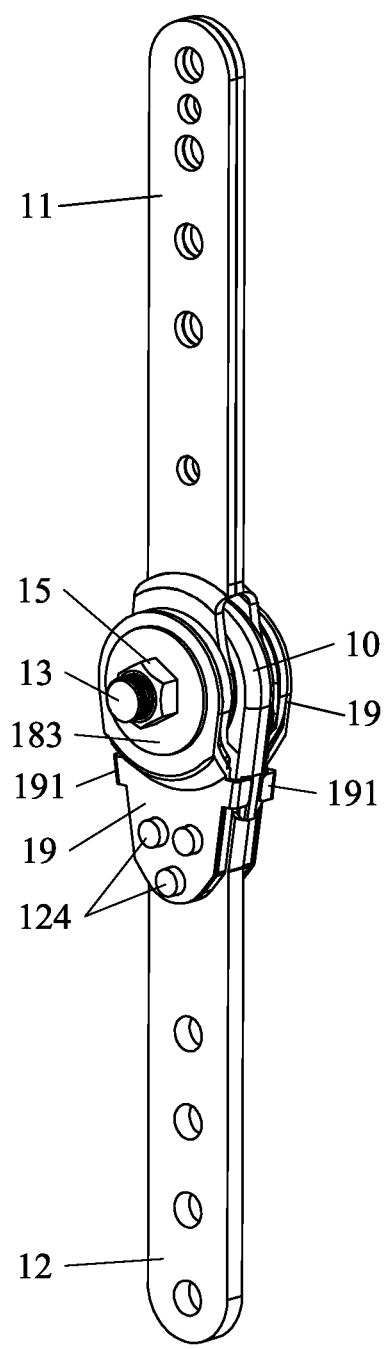
FIG. 1 is a perspective view of a hinge according to one embodiment of the present invention.
Figure 2:
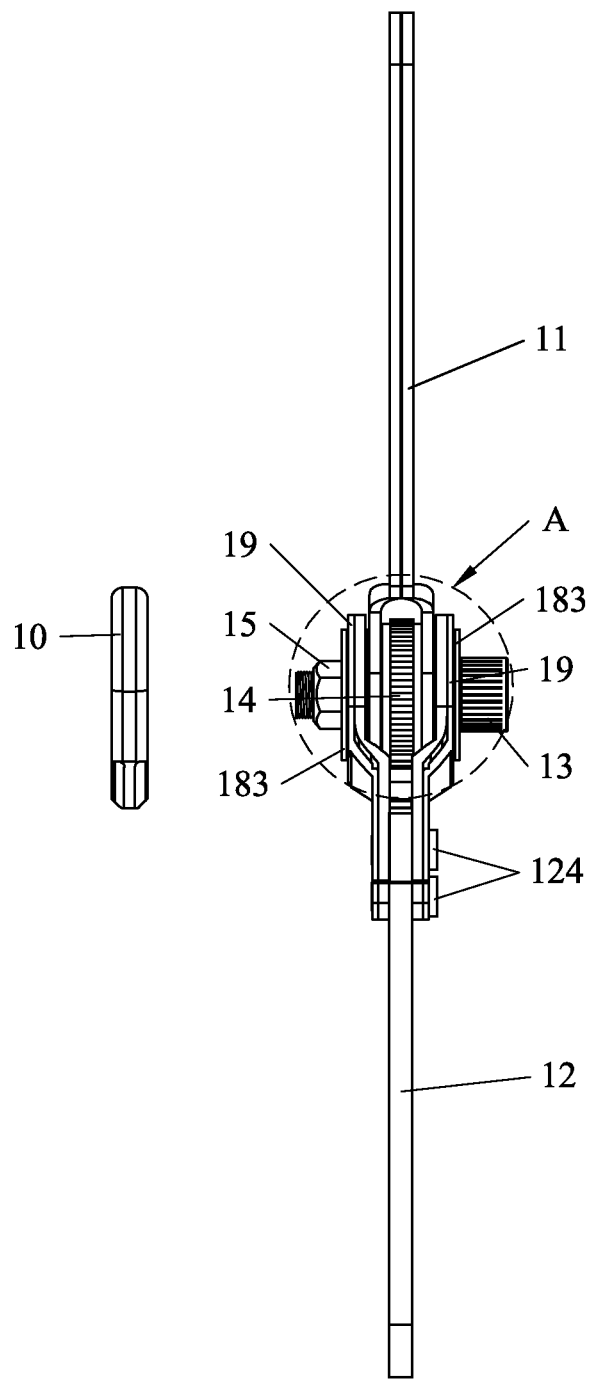
FIG. 2 is a side view of the hinge of FIG. 1.
Figure 3:
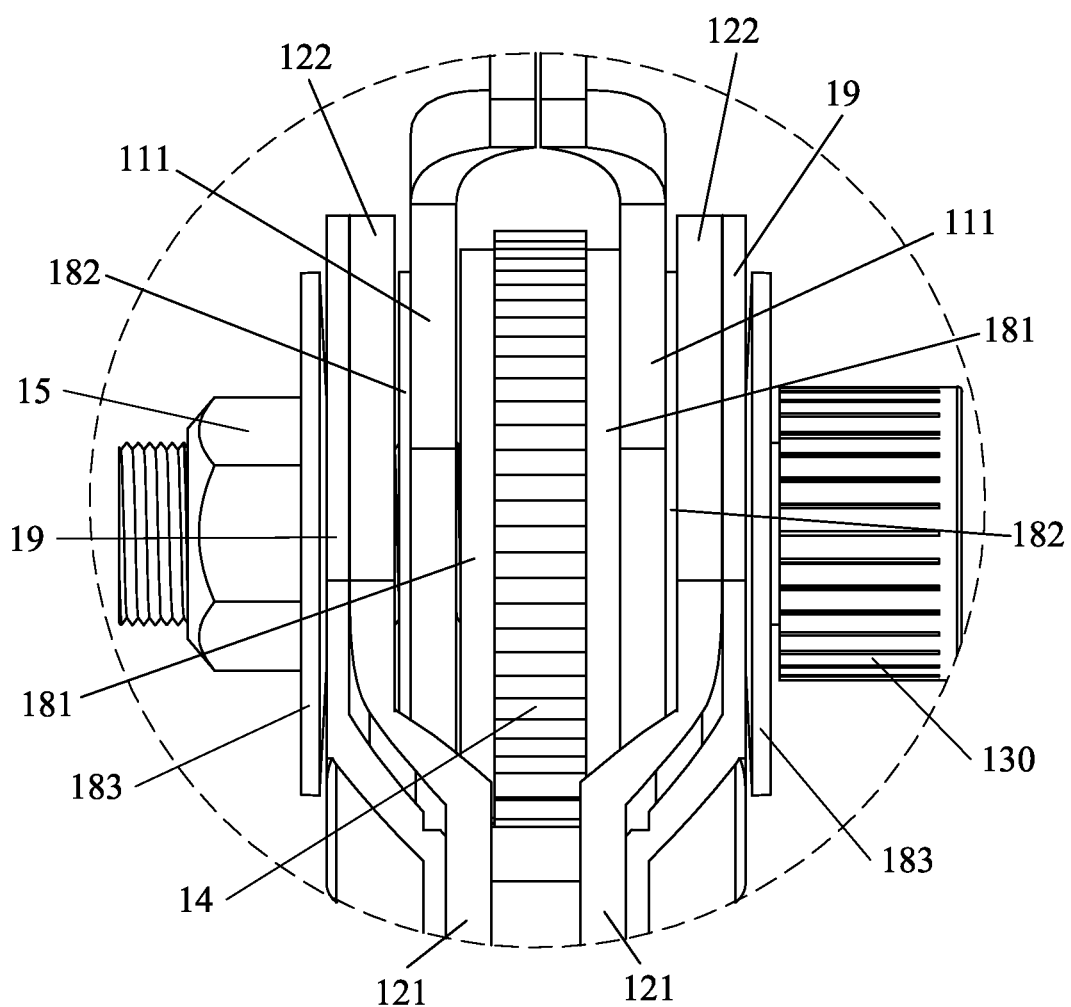
FIG. 3 is an enlarged view of A in FIG. 2.
Figure 4:
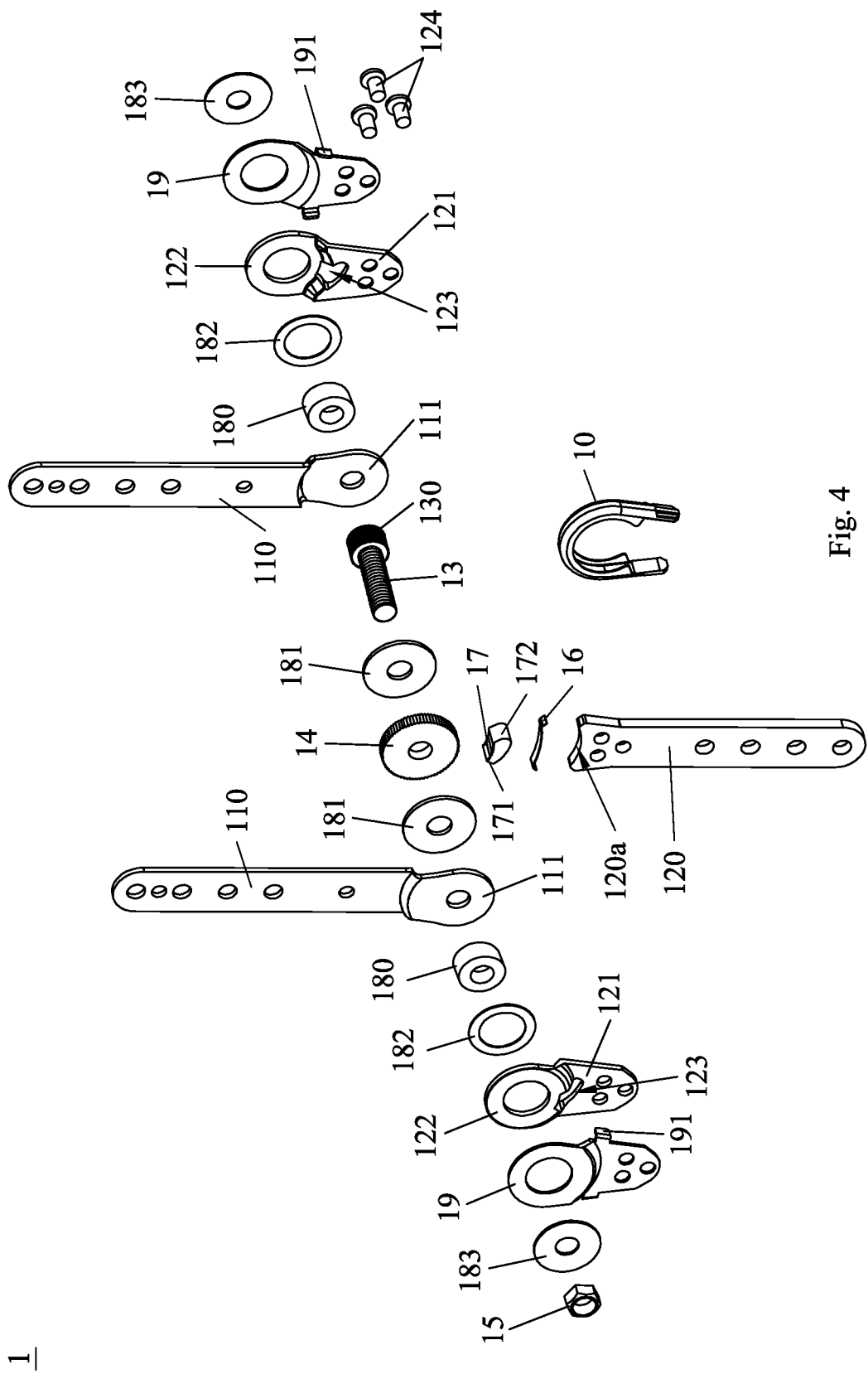
FIG. 4 is an exploded view of the hinge according to one embodiment of the present invention.

As illustrated in FIGS. 1 to 4, the hinge 1 of the present invention is applied to a pillow of a sofa (not shown), which can adjust angles of the pillow, so as to achieve a comfortable feeling for the users. The hinge 1 according to one embodiment of the present invention includes a first frame 11, a second frame 12, a bolt 13, a gear 14, an adjusting nut 15, a spring component 16, an engaging component 17 having engaging teeth, a shield 10, a first washer 181, the second washer 182, the third washer 183, and a cover 19.

One end of the bolt 13 has external threads, and the other end thereof has a bolt head 130, the outer diameter of the bolt head 130 is larger than the end of the bolt 13 having the external threads. A circular hole is opened at the center of the gear 14 corresponding to the bolt 13, and the gear 14 is rotatably set on the bolt 13.

A circular hole is opened at the center of the first washer 181 corresponding to the bolt 13, and the first washer 181 is rotatably set on the bolt 13. Two first washers 181 are respectively configured on both sides of the gear 14 and abut on the gear 14.

The first frame 11 includes two elongated plates 110, lower ends of the two elongated plates 110 are bended away from each other to form two disk-shaped first clamping portions 111, the two first clamping portions 111 are parallel to each other, and the other end of the two elongated plates 110 is fixed together. A circular hole is opened at the center of the first clamping portions 111 corresponding to the bolt 13, the first clamping portions 111 is rotatably set on the bolt 13, and the two first clamping portions 111 are respectively configured outside of the two first washers 181 and abut on the two first washer 181 so as to clamp the gear 14.

A circular hole is opened at the center of the second washer 182 corresponding to the bolt 13, the second washer 182 is rotatably set on the bolt 13, and the two second washers 182 are respectively configured outside of the two first clamping portions 111 and abut on the first clamping portions 111.

The second frame 12 includes a support rod 120 and two holders, each holder includes a clamping plate 121 and a cover 19, an upper end of the support rod 120 has an arc-shaped concave 120a, a lower end of the clamping plates 121 is fixed to the support rod 120, the upper ends of the two clamping plates 121 are bended away from each other to form two disk-shaped second clamping portions 122, the two second clamping portions 122 are parallel to each other. A circular hole is opened at the center of the second clamping portion 122 corresponding to the bolt 13, the second clamping portions 122 are rotatably set on the bolt 13, and the two second clamping portions 122 are respectively configured outside of the two second washer 182 and abut on the two second washer 182 so as to clamp the first clamping portions 111. An opening 123 is opened through each clamping plate 121 along a direction of the central axis of the bolt 13, the opening 123 is opened in a bending portion of the clamping plate 121, and two openings 123 of the two clamping plates 121 together define an accommodating cavity for movably receiving the engaging component 17. Specifically, the upper end of the support rod 120 and the lower end of the two clamping plates 121 all have three positioning holes opened therein, and the two clamping plates 121 and the support rod 120 are fixed together by positioning three rivets 124 in the three positioning holes.

In the present embodiment, the diameter of the circular hole opened in the second washer 182 and the second clamping portions 122 are larger than the outer diameter of the bolt 13 but are equal to the outer diameter of a socket component 180, the socket component 180 is configured in the circular hole of the second washer 182 and the second clamping portions 122, a circular hole is opened at the center of the socket component 180 corresponding to the bolt 13, the socket component 180 is rotatably set on the bolt 13. Of course, the second washer 182 and the second clamping portions 122 can be rotatably set on the bolt 13 as the first washer 181 and the first clamping portions 111.

The first washer 181 acts as an elastic buffer between the first clamping portion 111 and the gear 14 and avoids rigid contact therebetween, thereby avoiding abrasion. The second washer 182 acts as an elastic buffer between the first clamping portion 111 and the second clamping portion 122 and avoids rigid contact therebetween, thereby avoiding abrasion.

The first clamping portion 111 and the second clamping portion 122 are not limited to the disk-shaped structure, while the disk-shaped structure thereof facilitates the relative rotation of the first clamping portion 111 and the second clamping portion 122 without interference.

Two covers 19 are respectively fixed to the outside of the two clamping plates 121, the cover 19 and the clamping plates 121 are also fixed by the above-described rivets 124. The structure of the cover 19 is similar to that of the clamping plate 121 except that there is not opening opened in the cover 19, thereby the cover 19 can close the opening 123 in the clamping plate 121 and cover the accommodating cavity and the engaging component 17 in the accommodating cavity. Two sides of each cover 19 are respectively provided with a positioning portion 191 extending toward the other cover 19, two positioning portions 191 configured at the same side of the two covers 19 are opposite. The cover 19 shields the accommodating cavity and the engaging component 17 so as to prevent dust and foreign substances from falling into the accommodating cavity to effect the engagement of the engaging component 17 and the gear 14.

The shield 10 is made of an elastic material, such as plastic, and configured to be U-shaped, the shield 10 is set between the two first clamping portions 111 and wound around the gear 14, and two ends of the shield 14 are respectively positioned between the two opposite positioning portions 191. As the end of the shield 10 is positioned by the positioning portions 191, so the shield 10 could get close to the gear 14 and shield the outer edge of the gear 14. In addition, the shield 10 shields the exposed portion of the gear 14, not only protects the gear 14 and the engaging component 17, but also avoids hurting fingers when pivoting the hinge 1 manually, and enhances its appearance.

A circular hole is opened at the center of the third washer 183 corresponding to the bolt 13, and the third washer 183 is rotatably set on the bolt 13. Two third washers 183 are respectively configured on the outside of the two covers 19 and abut on the covers 19. Concretely, a third washer 183 is clamped between the cover 19 and the bolt head 130, another third washer 183 is clamped between the other cover 19 and the adjusting nut 15. The third washer 183 serves as an elastic buffer and avoids rigid contact between the cover 19 and the bolt 13 and the adjusting nut 15, thereby avoiding abrasion.

The adjusting nut 15 is screwed on the bolt 13 and clamps components configured between the adjusting nut 15 and the bolt head 130 together with the bolt head 130, the adjusting nut 15 provides clamping force for the first clamping portions 111 to clamp the gear 14, and also provides clamping force for the second clamping portions 122 to clamp the first clamping portions 111. The clamping force of the first clamping portions 111 and the second clamping portions 122 can be adjusted by tightening the adjusting nut 15, and the force that is required for rotating the first frame 11 relative to the second frame 12 is accordingly changed.

Two ends of the bolt 13 of the present embodiment can be configured with threads without bolt head 130, in this case, the hinge has two adjusting nuts 15, which are respectively screwed on the two ends of the bolt 13 so as to clamp components therebetween.

Figure 5:
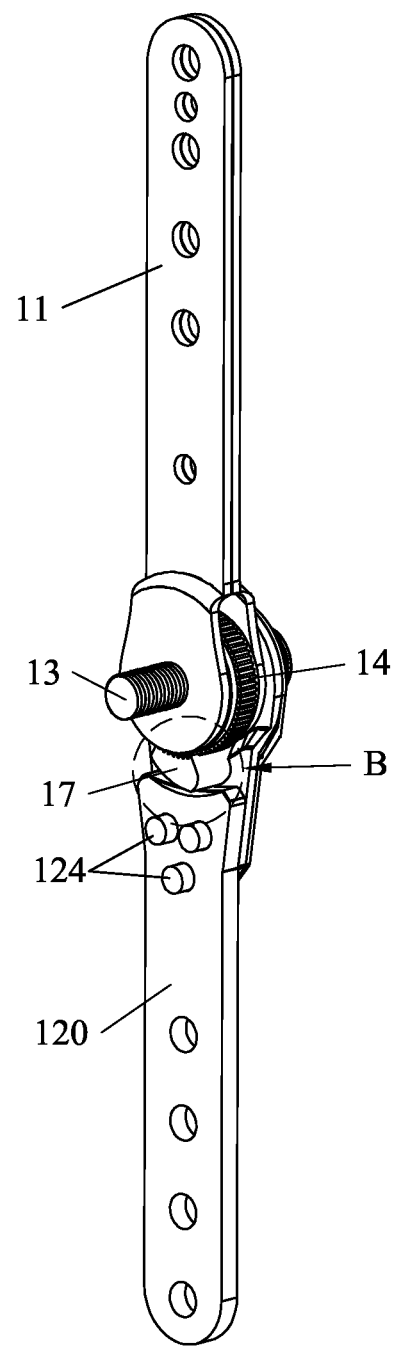
FIG. 5 is another perspective view illustrating the position of the engaging component according to one embodiment of the present invention.
Figure 6:
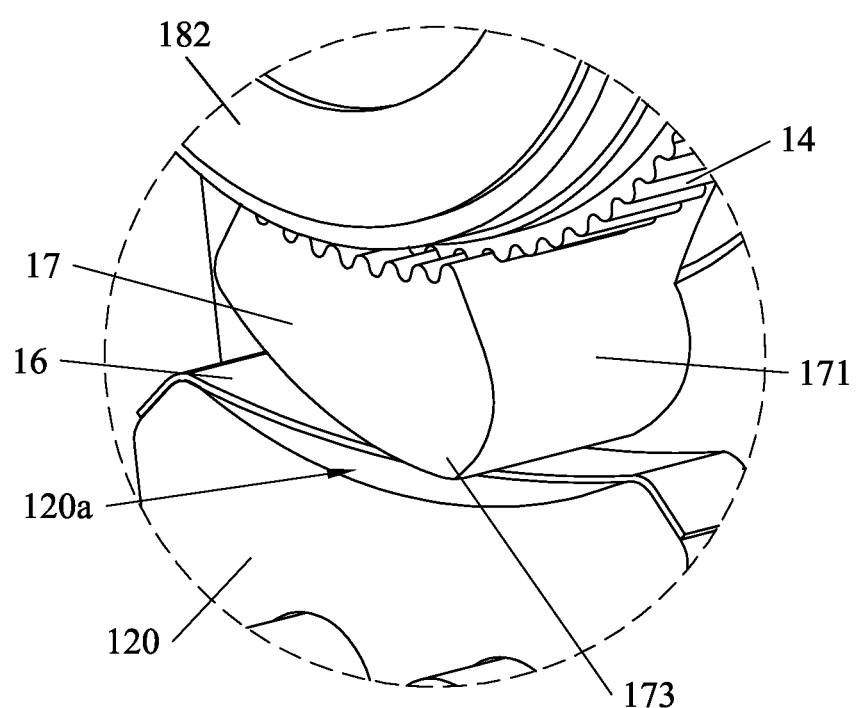
FIG. 6 is an enlarged view of B in FIG. 2.
Figure 7:
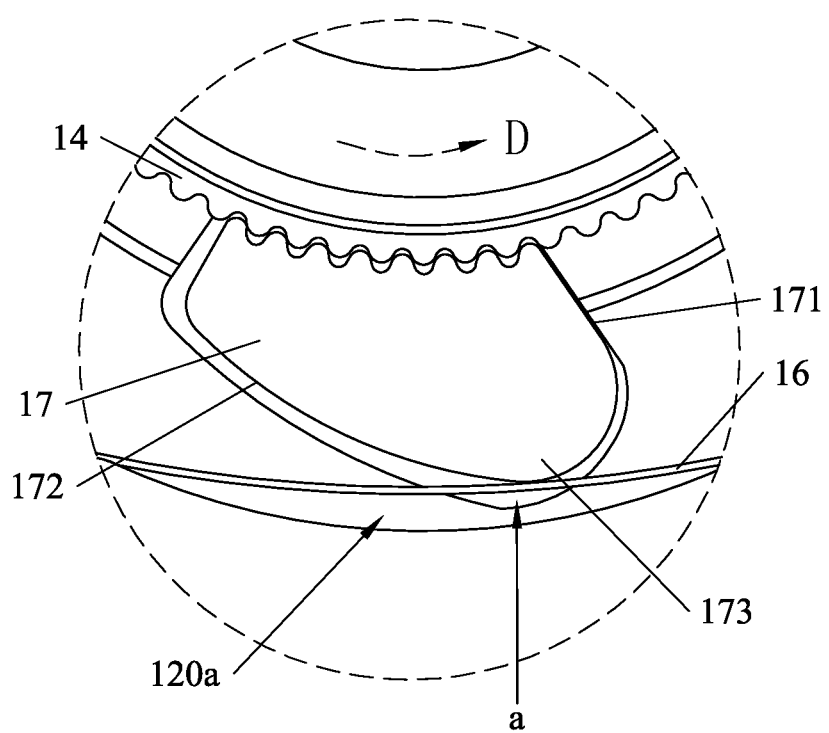
FIG. 7 is schematic view illustrating that the engaging component engages with the gear according to one embodiment of the present invention.

Referring to FIGS. 5 to 7, the engaging component 17 is configured in the accommodating cavity, an upper end of the engaging component 17 has multiple engaging teeth engaging with the gear 14, and the engaging component 17 further has a first sidewall 171 and a second sidewall 172 that are parallel to the central axis of the bolt 13. The first sidewall 171, the second sidewall 172 may be driven to respectively press against different sidewalls of the accommodating cavity or to be set apart from the sidewalls of the accommodating cavity by the gear 14. The lower end of the engaging component 17 that is away from the gear 14 is defined as end portion 173, which is configured between the first sidewall 171 and the second sidewall 172, and an unlocking space a is defined between the end portion 173 and a bottom wall of the accommodating cavity. when the first sidewall 171 presses against the sidewall of the accommodating cavity, the engaging component 17 moves downward to the unlocking space a so as to disengage from the gear 14, when the second sidewall 172 presses against the other sidewall of the accommodating cavity, the engaging component 17 can not move downward and engages with the gear 14 so as to prevent the gear 14 from rotating, The spring component 16 is configured between the second frame 12 and the engaging component 17 and provides elastic force for the engaging component 17 to engage with the gear 14. Concretely, the spring component 16 is a spring leaf, both ends of which are supported and positioned on both sides of the upper end of the support rod 120, the spring leaf is located above the arc-shaped concave 120a, and a portion thereof is accommodated in the accommodating cavity and presses against the end portion 173 of the engaging component 17. The spring leaf is used to provide elastic force for the engaging component 17 to engage with the gear 14 and then prevent the hinge 1 from rotating. The portion of the spring leaf configured in the accommodating cavity can be pressed by the engaging component 17 and make room for the engaging component 17 to move downwardly when the gear 14 is rotating. The arc-shaped concave 120a provides room for the spring leaf to deform.

The operation of the hinge 1 of the present invention will be illustrated below, referring to FIGS. 4, 7-10.

Figure 10:
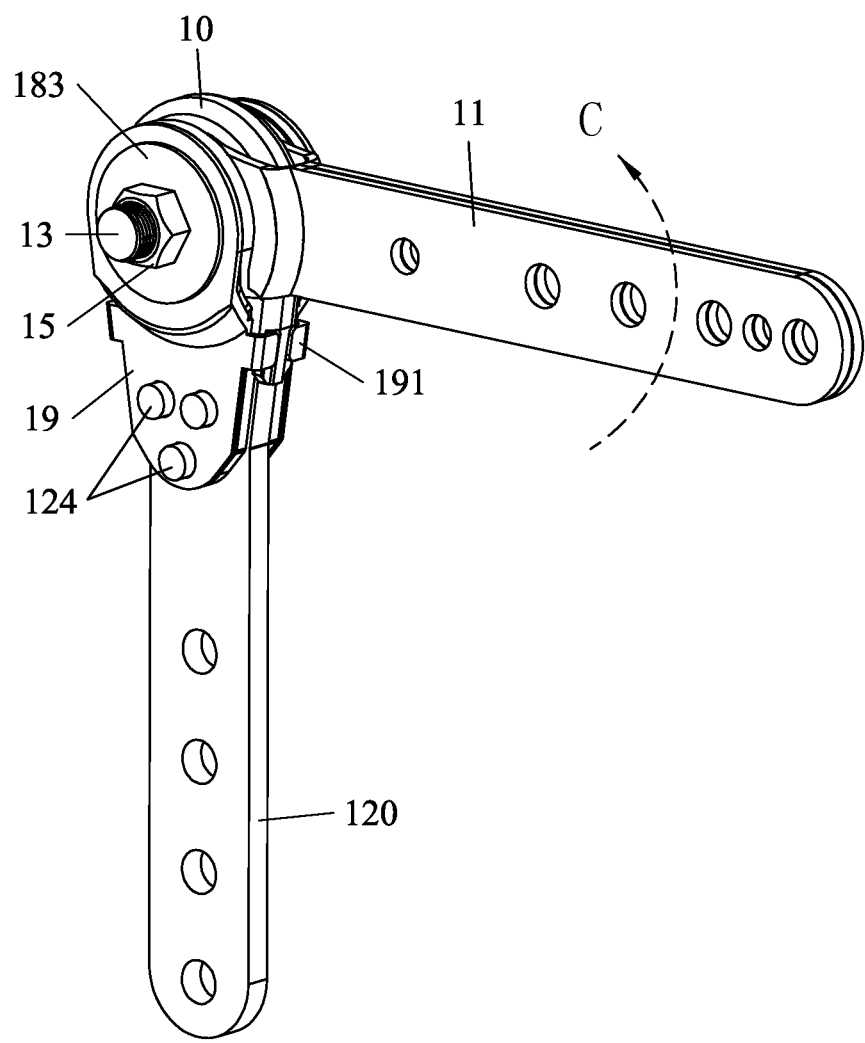
FIG. 10 is a perspective view illustrating that the first frame is positioned at an initial position.

When the first frame 11 of the hinge 1 is positioned at the initial position as shown in FIG. 10, at this point the engaging component 17 is jacked up by the spring leaf and engages with the gear 14, the first sidewall 171 and the second sidewall 172 of the engaging component 17 do not touch the sidewall of the accommodating cavity.

Figure 8:
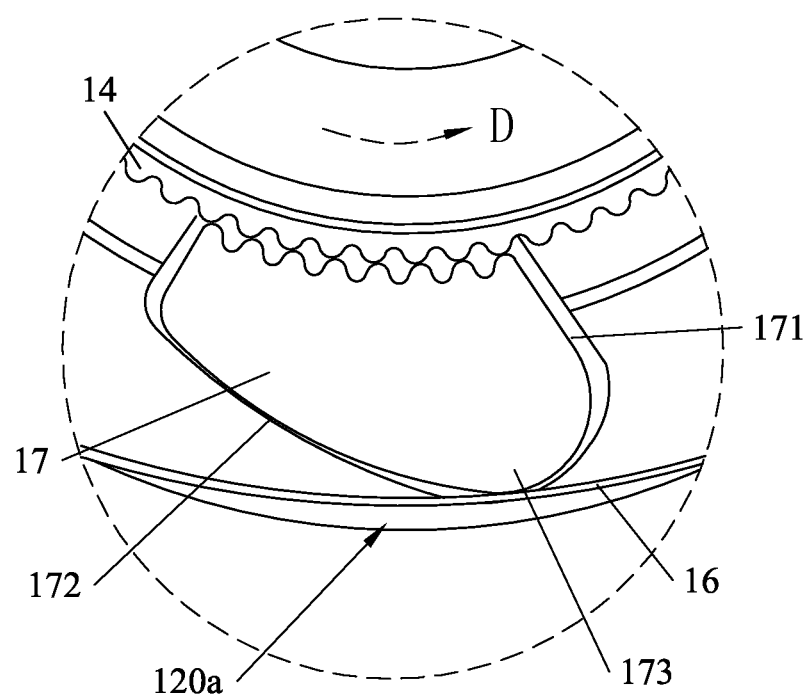
FIG. 8 is schematic view illustrating that the engaging component disengages with the gear according to one embodiment of the present invention.
Figure 11:
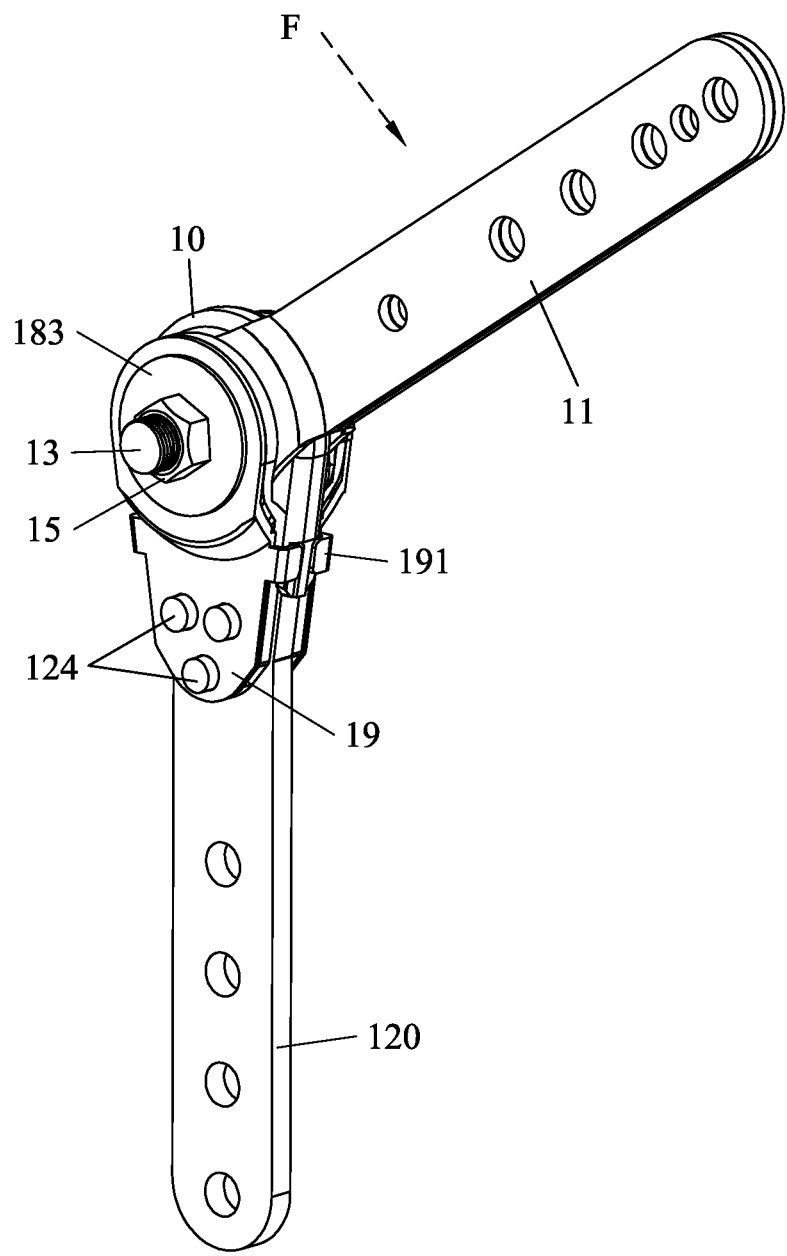
FIG. 11 is a perspective view illustrating that the first frame has rotated to an angle relative to the second frame.

When the angle between the first frame 11 and second frame 12 needs to be adjusted, pivoting the first frame 11 forward along a direction as indicated by the arrow C in the FIG. 10, the gear 14 can be urged to rotate synchronously with the first clamping portions 111 by the frictional force therebetween, which is created by the first washer 181 configured between the gear 14 and the first clamping portions 111 and clamping force provided by the adjusting nut 15. referring to FIG. 7, the gear 14 is urged to rotate in the direction D, at this point the gear teeth of the gear 14 provides an obliquely downward pushing force for the engaging teeth of the engaging component 17, and then the first sidewall 171 presses against the sidewall of the accommodating cavity, and further the engaging component 17 can overcome the elastic force of the spring component 16 and move downward so that the end portion 173 enter into the unlocking space a, at this point the engaging component 17 disengages from the gear 14, as shown in FIG. 8. When the gear 14 is rotated to a next tooth, the pushing force exerted on the engaging component 17 is lost, the restoring force of the spring component 16 upwardly presses against the engaging component 17 to engage with the gear 14 again, as shown in FIG. 7. During the rotating process of the first frame 11, the above process is repeated until the first frame 11 reaches a satisfactory position, for example, a position as shown in FIG. 11.

Figure 9:
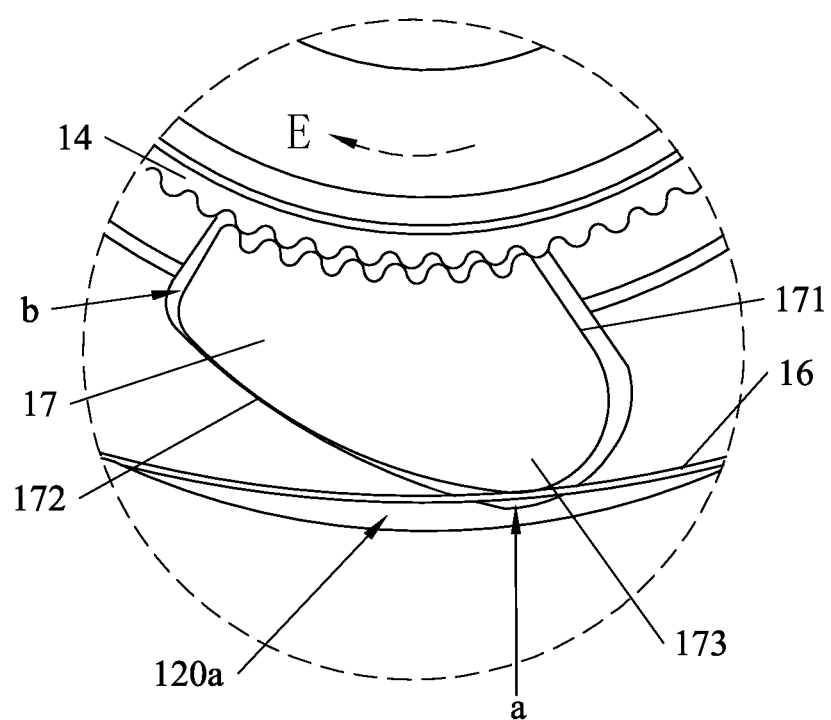
FIG. 9 is schematic view illustrating that the gear is locked by the engaging component when the gear rotates reversely according to one embodiment of the present invention.

In use, the first frame 11 adapted for supporting a headrest suffering a downward force F due the headrest being leant against, the first frame has a trend to rotate reversely under the force F, but at this point the second sidewall 172 of the engaging component 17 presses against the sidewall of the accommodating, as shown in FIG. 9, the engaging component 17 is not completely out of the gear 14, and the engaging component 17 can not move downward further, so the gear 14 being engaged by the engaging component 17 is locked and can not rotate along the direction E, thus the first frame 11 can be kept in the use status. When pivoting the first frame 11 reversely, the force exerted on the first frame 11 is larger than the force for pivoting the first frame 11 forward, concretely, the force exerted on the first frame 11 is larger then the frictional force between the first clamping portions 111 and the first washer 181, then the first clamping portions 111 can rotate relative to the first washer 181, and the first frame can be adjusted reversely.

The hinge 1 can be mounted in the seat or sofa to adjust the angle of the headrest. The second frame 12 may be fixed to the seat or sofa, while the first frame 11 is fixed to the headrest, when the angle of the headrest needs to be adjusted, pulling the headrest, the first frame 11 is rotated relative to the second frame 12 until the headrest rotates to a satisfactory position, the headrest has a certain supporting capacity because the gear 14 engages with the engaging component 17, and would not easily rotate back. When the force exerted is increased enough, the headrest can be adjusted reversely at any position.

The clamping force of the two first clamping portions 111 and the second clamping portions 122 is provided by the screw joint of the adjusting nut 15 and the bolt 13, the tightening of the adjusting nut 15 screwed on the bolt 13 directly determines the clamping force, which determines the force for pivoting the first frame 11 relative to the second frame 12.

Figure 12:
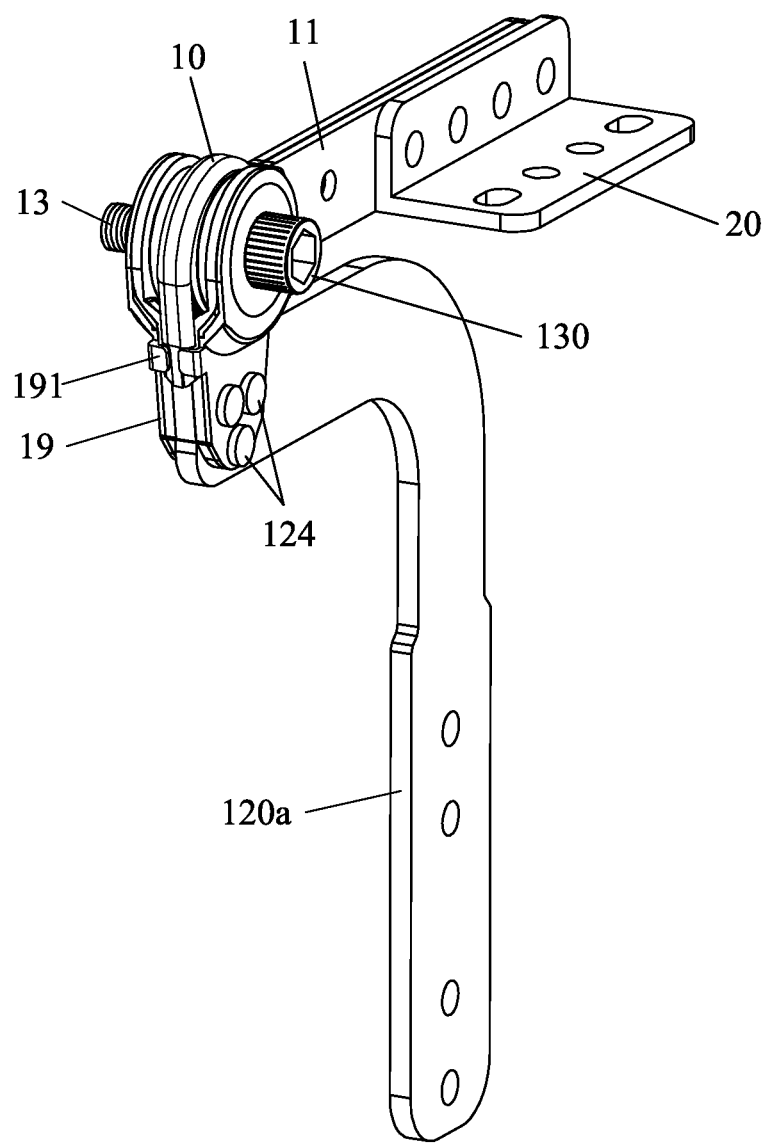
FIG. 12 is a perspective view of a hinge according to second embodiment of the present invention.

FIG. 12 illustrates a hinge 1a according to second embodiment of the present invention, the hinge 1a of the present embodiment differs from the first embodiment in a support rod 120a and a connecting component 20, the support rod 120a of the hinge 1a has an inverted L-shaped configuration, and the connecting component 20 is fixed on the first frame 11.

Figure 13:
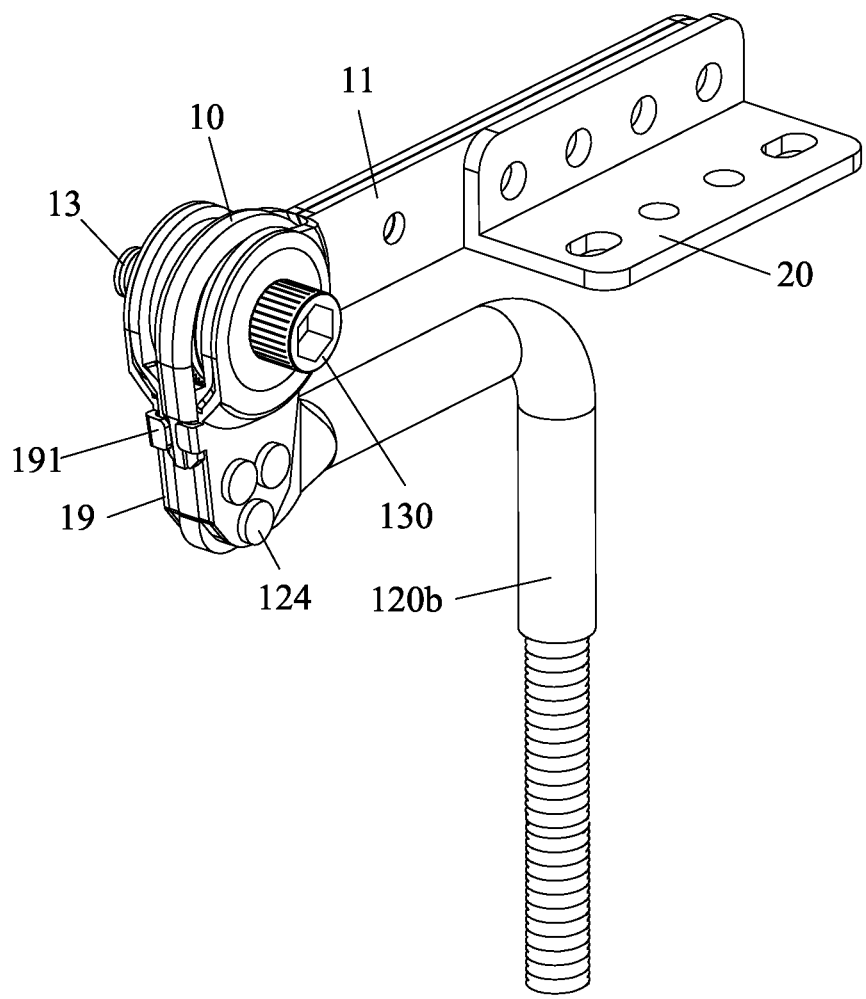
FIG. 13 is a perspective view of a hinge according to third embodiment of the present invention.

FIG. 13 illustrates a hinge 1b according to third embodiment of the present invention, the difference between the present embodiment and the second embodiment is that the support rod 120b of the hinge 1b is in a cylindrical shape but not in a flat shape, and the lower end of the support rod 120b is bended and has external thread for mounting.

Figure 14:
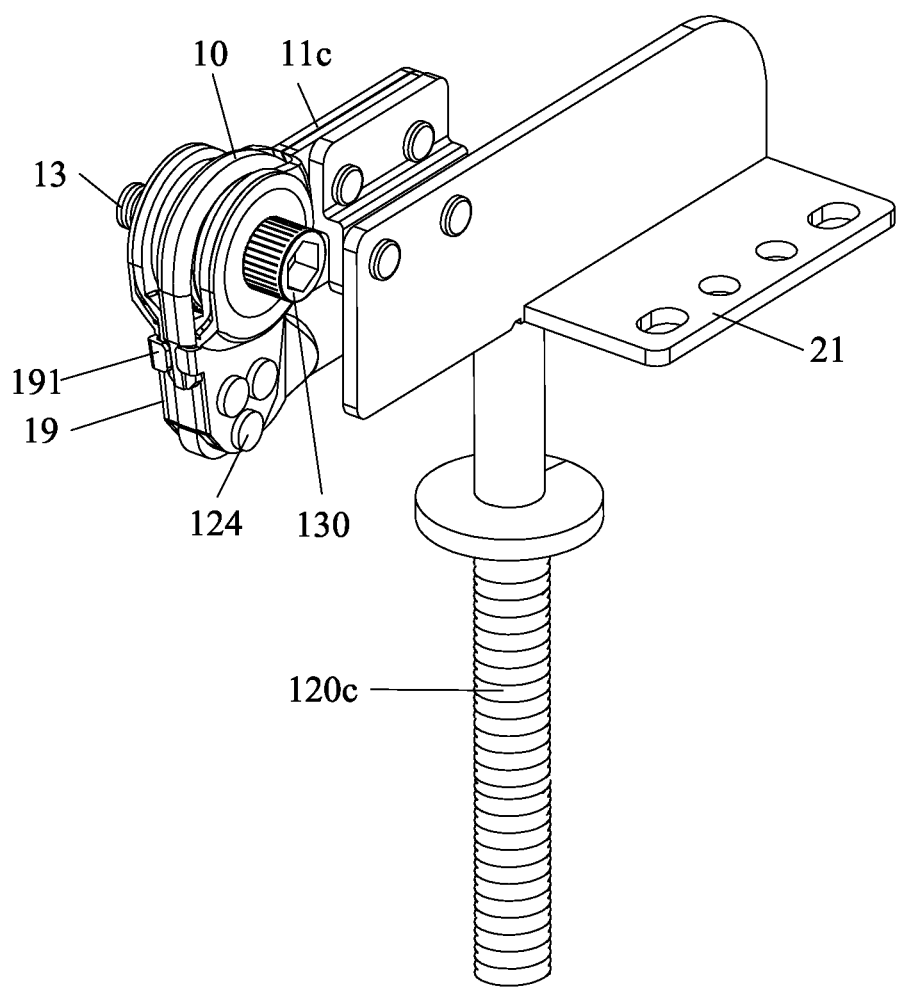
FIG. 14 is a perspective view of a hinge according to forth embodiment of the present invention.
Figure 15:
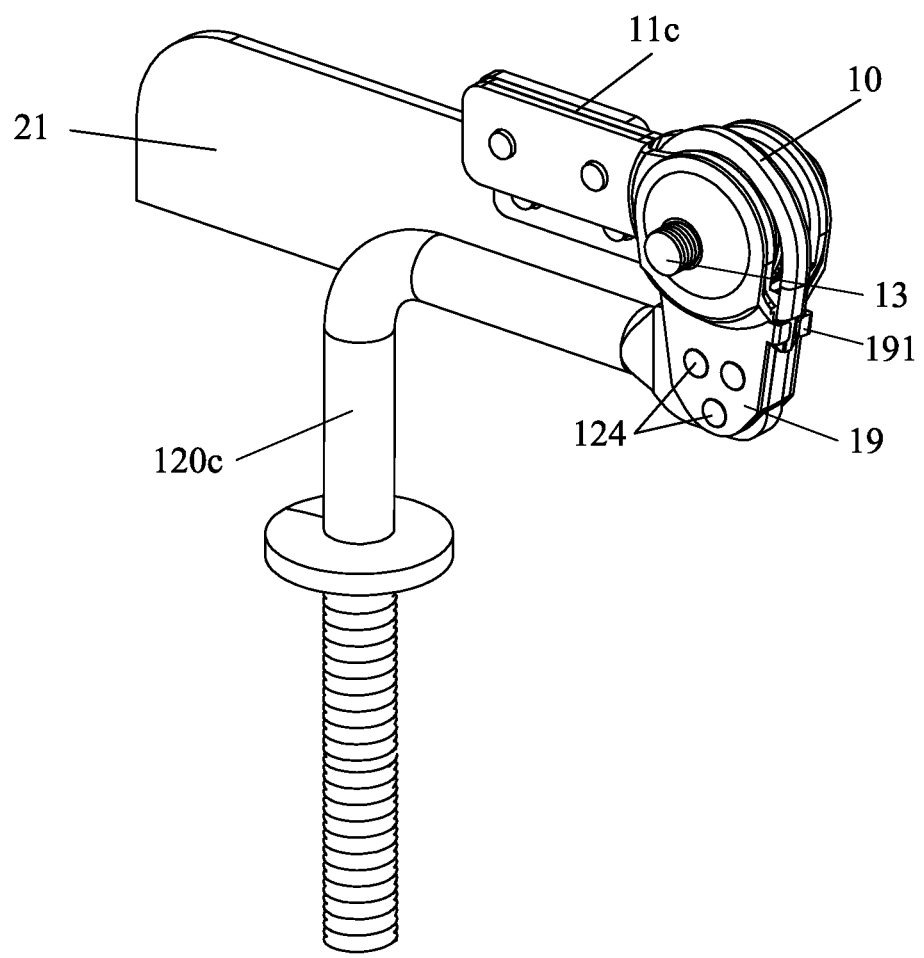
FIG. 15 is another perspective view of a hinge according to forth embodiment of the present invention.

FIGS. 14 and 15 illustrate a hinge 1c according to forth embodiment of the present invention, a lower end of the support rod 120c thereof is also bended and has external thread, and a disk-shaped component is configured at the upper end of the external thread in order to prevent the hinge 1c from falling when screwed joint is loose or damaged. The first frame 11c of the present embodiment is short, and the connecting component 21 fixed thereon is larger than the connecting component 20 of the second embodiment.

Figure 16:
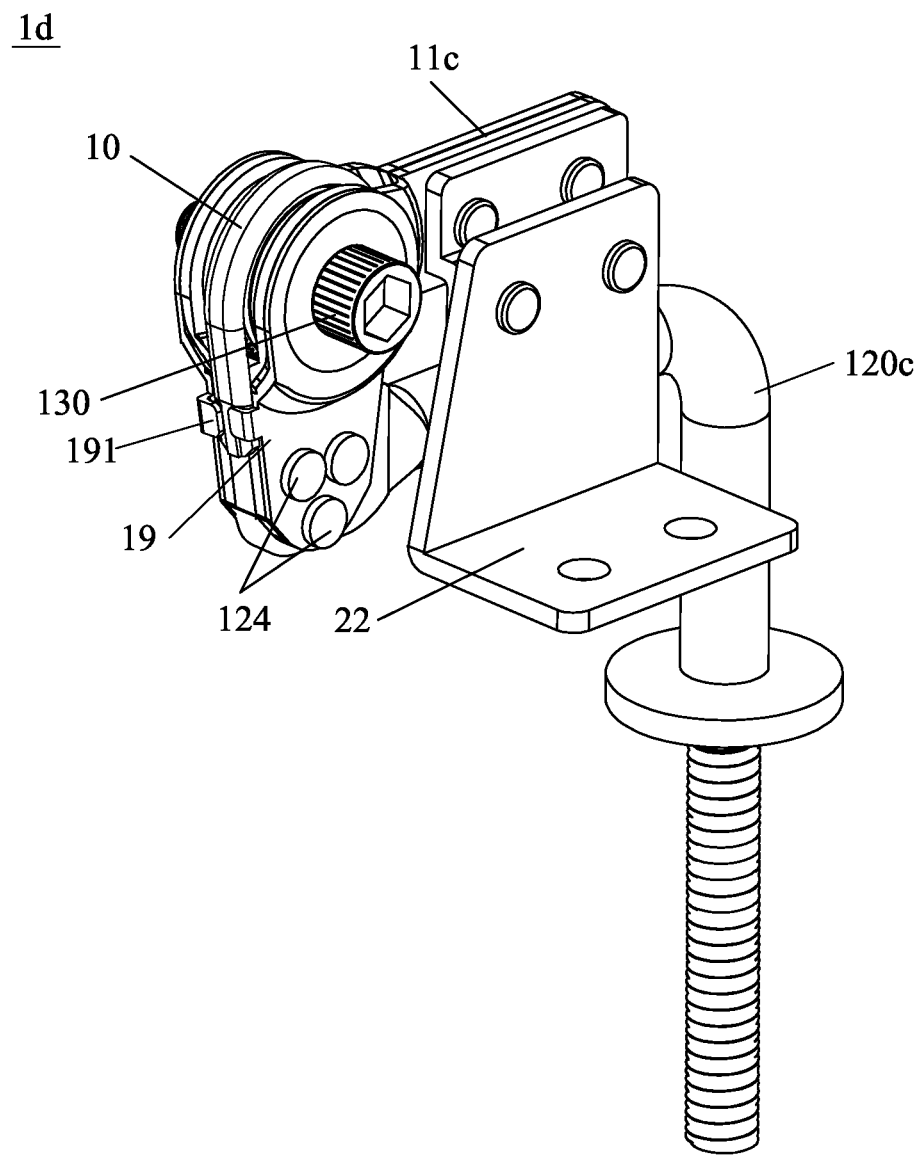
FIG. 16 is a third perspective view of a hinge according to forth embodiment of the present invention.

FIG. 16 illustrates a hinge 1d according to fifth embodiment of the present invention, the present embodiment differs from the fourth embodiment in the structure of a connecting component 22, the width thereof is larger than that of the connecting component 21, and the connecting component 22 has an L-shaped cross-section.

Compared with the prior art, as the screw joint of the adjusting nut 15 and the bolt 13 can be used to provide clamping force for the two first clamping portions 111 to clamp the gear 14, when pivoting the first frame 11 forward, the gear 14 can be urged to rotate synchronously with the first frame 11 by the clamping force of the first clamping portions 111, as an unlocking space a is defined between the end portion 173 of the engaging component 17 and bottom wall of the accommodating cavity, so when the gear 14 rotates and urges the first sidewall 171 of the engaging component 17 to press against the sidewall of the accommodating cavity, the engaging component 17 can overcome the elastic force of the spring component 16 and move downward to the unlocking space a, thereby disengaging from the gear 14, and the first frame 11 and the gear 14 can rotate further. When pivoting the first frame 11 reversely by a roughly the same force as forward pivoting, the second sidewall 172 of the engaging component 17 is stopped by another sidewall of the accommodating cavity, and the engaging component 17 can not move downwardly and keep engaging with the gear 14, thereby the first frame 11 can not rotate by the force. While, when the force exerted on the first frame 11 is increased enough to overcome the frictional force between the first clamping portions 111 of the first frame 11 and the second clamping portions 12 and the gear, the first clamping portion 111 can rotate relative to the second clamping portions 122 and the gear 14, namely, the first frame 11 starts to rotate reversely. The reverse rotation is started by the increased force applied on the first frame 11 without rotating forward the first frame 11 to the very end, and the operation is simple and time saving.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A hinge, comprising a first frame, a second frame, a bolt, a gear, an adjusting nut, a spring component, a shield, and an engaging component having engaging teeth, the gear being rotatably set on the bolt, an end of the first frame having two opposite first clamping portions, the two first clamping portions being rotatably set on the bolt and clamping the gear, an end of the second frame having two opposite second clamping portions, the two second clamping portions being rotatably set on the bolt and clamping the two first clamping portions, the adjusting nut being screwed on the bolt and providing clamping force for the two first clamping portions and the two second clamping portions, an accommodating cavity being opened in the second frame, the engaging component being received in the accommodating cavity and engaging with the gear, the engaging component having a first sidewall, a second sidewall, and an end portion configured between the first sidewall and the second sidewall, the first sidewall and the second sidewall respectively being withstood with two sidewalls of the accommodating cavity in a separable manner, an unlocking space being defined between the end portion and a bottom wall of the accommodating cavity, when the first sidewall being withstood with one sidewall of the accommodating cavity, the engaging component moving downward to the unlocking space so as to disengage from the gear, when the second sidewall being withstood with the other sidewall of the accommodating cavity, the engaging component keeping engaging with the gear so as to prevent the gear from rotating, the spring component being configured between the second frame and the engaging component and providing elastic force for the engaging component to engage with the gear, and the shield being configured between the two first clamping portions and shielding an outer edge of the gear.

2. The hinge according to claim 1, wherein a first washer is configured between the first clamping portion and the gear.

3. The hinge according to claim 1, wherein a second washer is configured between the first clamping portion and the second clamping portion.

4. The hinge according to claim 1, wherein the spring component is a spring leaf, both ends of which are positioned on the second frame, and a portion of the spring leaf is accommodated in the accommodating cavity and withstood with the end of the engaging component that is away form the gear.

5. The hinge according to claim 1, wherein the first sidewall and the second sidewall are parallel to a central axis of the bolt.

6. The hinge according to claim 1, wherein the first frame comprises two elongated plates fixedly connected with each other, and one end of the two elongated plates is bended to form the first clamping portions.

7. The hinge according to claim 1, wherein the second frame comprises a support rod and two holders, one end of the two holders is fixed to the support rod, the other end of the two holders is bended to form the two second clamping portions, and the accommodating cavity is opened in the two holders.

8. The hinge according to claim 7, wherein each holder comprises a clamping plate and a cover, two clamping plates are fixed to the support rod, the accommodating cavity is opened through the two clamping plates along a direction of the central axis of the bolt, and two covers are respectively fixed to the two clamping plates for covering the accommodating cavity and the engaging component.

9. The hinge according to claim 8, wherein the bolt has a bolt head, a third washer is configured between the cover and the bolt head, and another third washer is configured between the cover and the adjusting nut.

10. The hinge according to claim 7, wherein two sides of each holder are respectively provided with a positioning portion extending toward the other holder, two positioning portions configured at the same side of the two holders are opposite, and two ends of the shield are respectively positioned between the two opposite positioning portions.

* * * * *